United States Patent
Siegman et al.

(10) Patent No.: US 8,275,857 B2
(45) Date of Patent: Sep. 25, 2012

(54) REMOTE SESSION RECORDING APPARATUS AND METHOD

(75) Inventors: Craig Siegman, Pembroke Pines, FL (US); Steven Geffin, N. Miami Beach, FL (US)

(73) Assignee: Avocent Corporation, Huntsville, AL (US)

(*) Notice: Subject to any disclaimer, the term of this patent is extended or adjusted under 35 U.S.C. 154(b) by 1453 days.

(21) Appl. No.: 11/797,296

(22) Filed: May 2, 2007

(65) Prior Publication Data

US 2007/0261097 A1  Nov. 8, 2007

Related U.S. Application Data

(60) Provisional application No. 60/796,872, filed on May 3, 2006.

(51) Int. Cl.
G06F 15/16 (2006.01)
(52) U.S. Cl. .................................................. 709/219
(58) Field of Classification Search .................. 709/203, 709/219, 220, 223, 224
See application file for complete search history.

(56) References Cited

U.S. PATENT DOCUMENTS

| | | | | |
|---|---|---|---|---|
| 7,478,182 B2* | 1/2009 | Schweig | .......................... | 710/73 |
| 2002/0116539 A1* | 8/2002 | Bryczkowski et al. | ........ | 709/317 |
| 2002/0154210 A1 | 10/2002 | Ludwig et al. | | |
| 2003/0005186 A1 | 1/2003 | Gough | | |
| 2004/0228394 A1 | 11/2004 | Fukada | | |
| 2005/0066000 A1 | 3/2005 | Liaw et al. | | |
| 2005/0210101 A1 | 9/2005 | Janik | | |
| 2005/0231462 A1 | 10/2005 | Chen | | |
| 2007/0030584 A1* | 2/2007 | Winger | .......................... | 360/55 |
| 2007/0247430 A1* | 10/2007 | Huang | .......................... | 345/168 |

FOREIGN PATENT DOCUMENTS

JP   2004-220160   8/2004

OTHER PUBLICATIONS

Search Report and Written Opinion mailed Apr. 16, 2008 in International Appln. No. PCT/US2007/010634.
EP Appln. No. 07776613—Jul. 25, 2011 EPO Supplementary European Search Report, pp. 1-8.

* cited by examiner

*Primary Examiner* — John MacIlwinen
(74) *Attorney, Agent, or Firm* — Davidson Berquist Jackson & Gowdey, LLP

(57) ABSTRACT

An Intelligent Network Peripheral (INP) is equipped with a recording control processor that is connected to at least one internal or external recording device (e.g., hard drive, disk array, CD-recorder, DVD recorder, and/or tape device). Using the INP, a user may be prompted to perform an activity, such as (1) start a new recording session, (2) playback a recorded session, (3) delete a recorded session, (4) edit recording parameters (e.g., the number of stored frames, the length of a session to record, the resolution of the image to record), and (5) re-run a recorded session. An INP may be incorporated into a Keyboard/Video/Mouse (KVM) switch, a Rack Connection Manager (RCM) and/or a Pod Extension Module (PEM) for recording at least one of video from and user input to a computer for diagnostic and other purposes.

21 Claims, 11 Drawing Sheets

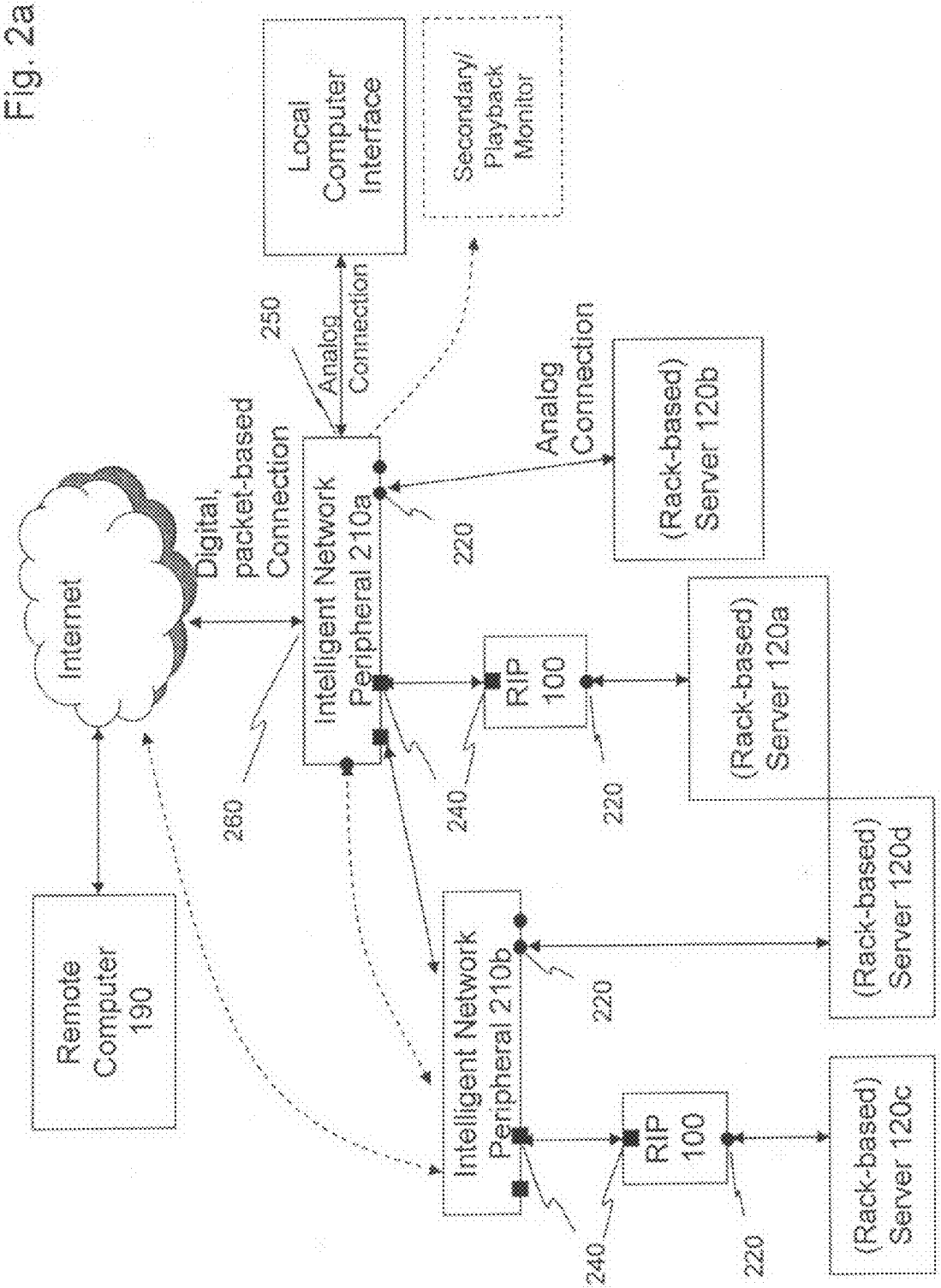

REMOTE SESSION RECORDING APPARATUS AND METHOD

CROSS-REFERENCE APPLICATIONS

The present application claims priority to U.S. Provisional Application Ser. No. 60/796,872, filed May 3, 2006, the entire contents of which are incorporated herein by reference.

FIELD OF INVENTION

The present application is directed to remotely recording information about a remote computer system for later playback, and in at least one embodiment to an intelligent network peripheral (e.g., a Keyboard/video/Mouse (KVM) switch, a Rack Connection Manager (RCM) and/or a Pod Extension Module (PEM)) for recording at least one of video from and user input to a remote computer for diagnostic and other purposes.

DISCUSSION OF THE BACKGROUND

As illustrated in FIG. 1, a known Rack Interface Pod (RIP) 100 can be provided for receiving video signals from a server computer 120, such as a rack-mounted server, and providing the video signals to a remote user at a remote computer 190 via (among possibly other things) a local area network (LAN) or Wide Area Network (WAN) 195. The analog signals received by the RIP 100 from the server 120 are transmitted to Avocent Rack Interconnect (ARI) ports on a Rack Connection Manager (RCM) 160 either directly or via a Pod Extension Module (PEM) 140. The RCM 160 includes video processing logic, a supervisory processor, a KVM switch system, and Ethernet interface circuitry.

The remote user of the remote computer 190 connected to the LAN/WAN 195 has the capability of selecting a particular network server (e.g., 120b) among the plurality of network servers (120a . . . 120n) through the PEM 140. The remote user is also capable of selecting a particular network server (e.g., 120o, 120p or 120q) that is directly connected to an ARI-port of the RCM 160. A portion of the circuitry located within the RCM 160 digitizes the KVM signals from a selected network server and forwards the digitized signals to the remote user via the LAN/WAN 195 (optionally through an analog Internet Protocol Video (IPV) Module 180). Likewise, the remote users' keyboard strokes and mouse movements are passed via the LAN/WAN 195 to the processor of the RCM 160 which in-turn passes the signals to the selected network server via (1) PEM 140 in the event the network server is connected to the PEM 140 or (2) directly via an ARI (e.g., in the case of servers 120o, 120p and 120q).

SUMMARY OF THE INVENTION

Intelligent Network Peripherals (INPs) (e.g., a Keyboard/Video/Mouse (KVM) switch, a Rack Connection Manager (RCM) and/or a Pod Extension Module (PEM)) Rack Interface Pods (RIPs)) or similar devices can be augmented with a recording and playback capability instead of simply acting as a pass through for user interface information.

BRIEF DESCRIPTION OF THE DRAWINGS

The following description, given with respect to the attached drawings, may be better understood with reference to the non-limiting examples of the drawings, wherein:

FIG. 2a is a connection-level diagram representing various connections of an Intelligent Network Peripheral (INP) according to a first exemplary embodiment of the present invention;

DISCUSSION OF THE PREFERRED EMBODIMENTS

Turning to FIG. 2a, an Intelligent Network Peripheral (INP) 210 (such as INP 210a) may connect to a server 120 (either rack-based or stand-alone) either directly or via a Rack Interface Pod (RIP) 100 (acting as a video processor). The INP 210 may be a separate device or its functionality may be added to in a number of known components, such as a Keyboard/Video/Mouse (KVM) switch, a Rack Connection Manager (RCM), a Pod Extension Module (PEM) or an Internet Protocol Video (IPV) Module. The INP 210 preferably is compatible in size and shape with existing rack mounted equipment (e.g., 1 U high equipment). The RIP 100 includes a housing with at least one user interface connector 220 (represented as a circle) for receiving video from and for transmitting user interface commands to a server 120. The user interface connector 220 preferably includes a connector for directly receiving the output of a video adapter which may be analog (e.g., VGA, XGA, SVGA, RGB) or digital. Alternatively, the output of a video adapter may be pre-processed before being received at the user interface connector 220. The connectors can be any one or a combination of connectors for receiving HDMI cables, VGA-style cables, S-video cables, RCA connections and coaxial cables.

In the exemplary embodiment of FIG. 2a, the INP 210 includes communications ports 240 (represented as squares) for receiving signals from respective RIPs 100 or other INP-style devices. Connected to the communications ports 240 may be any physical medium including but not limited to, Ethernet-style cable (e.g., CAT-5, CAT-5e, CAT-6) or coaxial cable. The INP 210 may further include at least one user interface connector 220 for directly receiving the output for a server 120 and for passing user interface signals (or signals from peripheral devices) to a server 120.

Figure 1:
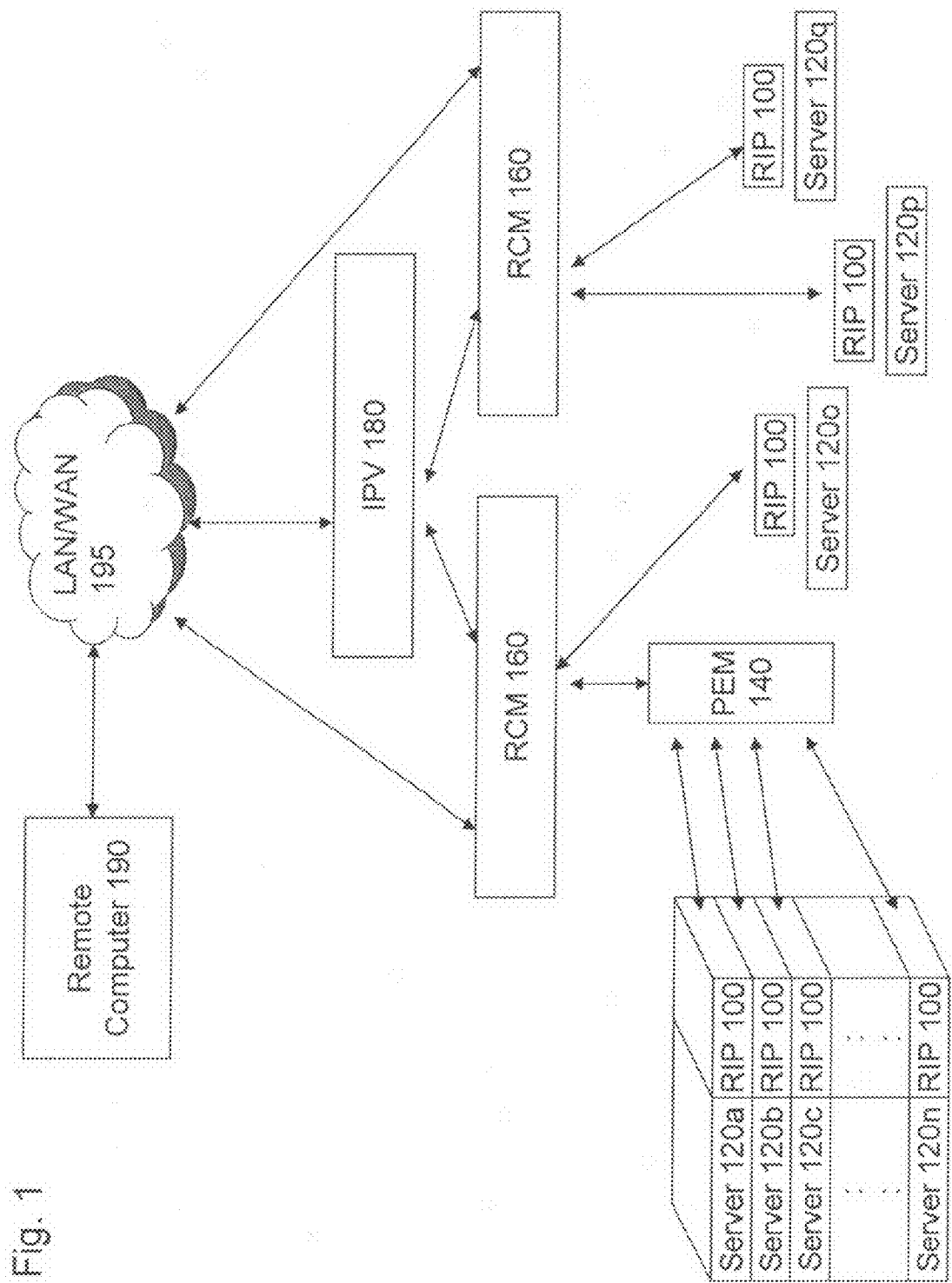
FIG. 1 is a high-level diagram representing a known configuration for using a keyboard/video/mouse (KVM) switch.
Figure 2B:
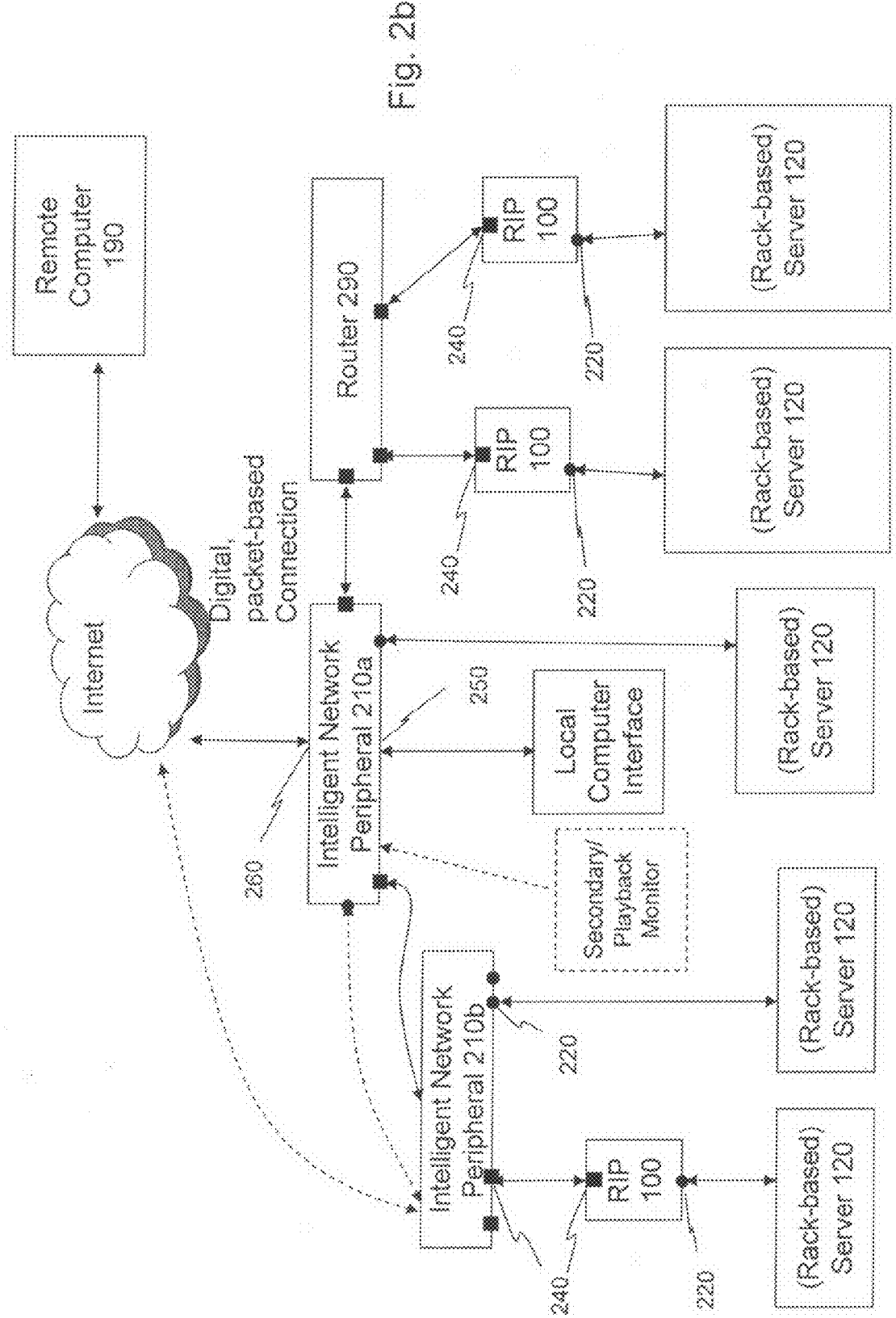
FIG. 2b is a connection-level diagram representing various connections of an Intelligent Network Peripheral (INP) according to a second exemplary embodiment of the present invention.

In the exemplary embodiment of FIG. 2b, the INP 210 includes only a single communications port 240 connected to a router 290 which routes signals to the INP 210 from plural RIPs 100. In the embodiment of FIG. 2b, the RIPs 100 provide sufficient routing information along with the other signals to enable the RIPs 100 to identify an INP 210 and vice versa. Such routing may be based on reliable or unreliable datagrams and includes, but is not limited to, IP-based routing, ATM-based routing, TCP/IP-based routing and UDP-based communications.

As further shown in both FIGS. 2a and 2b, the INPs 210 may be cascaded together, thereby creating a tree of servers connected via INPs 210 (or other similar devices, e.g., KVM switches). As shown, the INPs can be cascaded either using a digital connection or an analog connection or both, depending on the configuration of the INP and the available ports. Additionally, the type and number of ports can be varied without departing from the teachings herein.

Figure 3A:
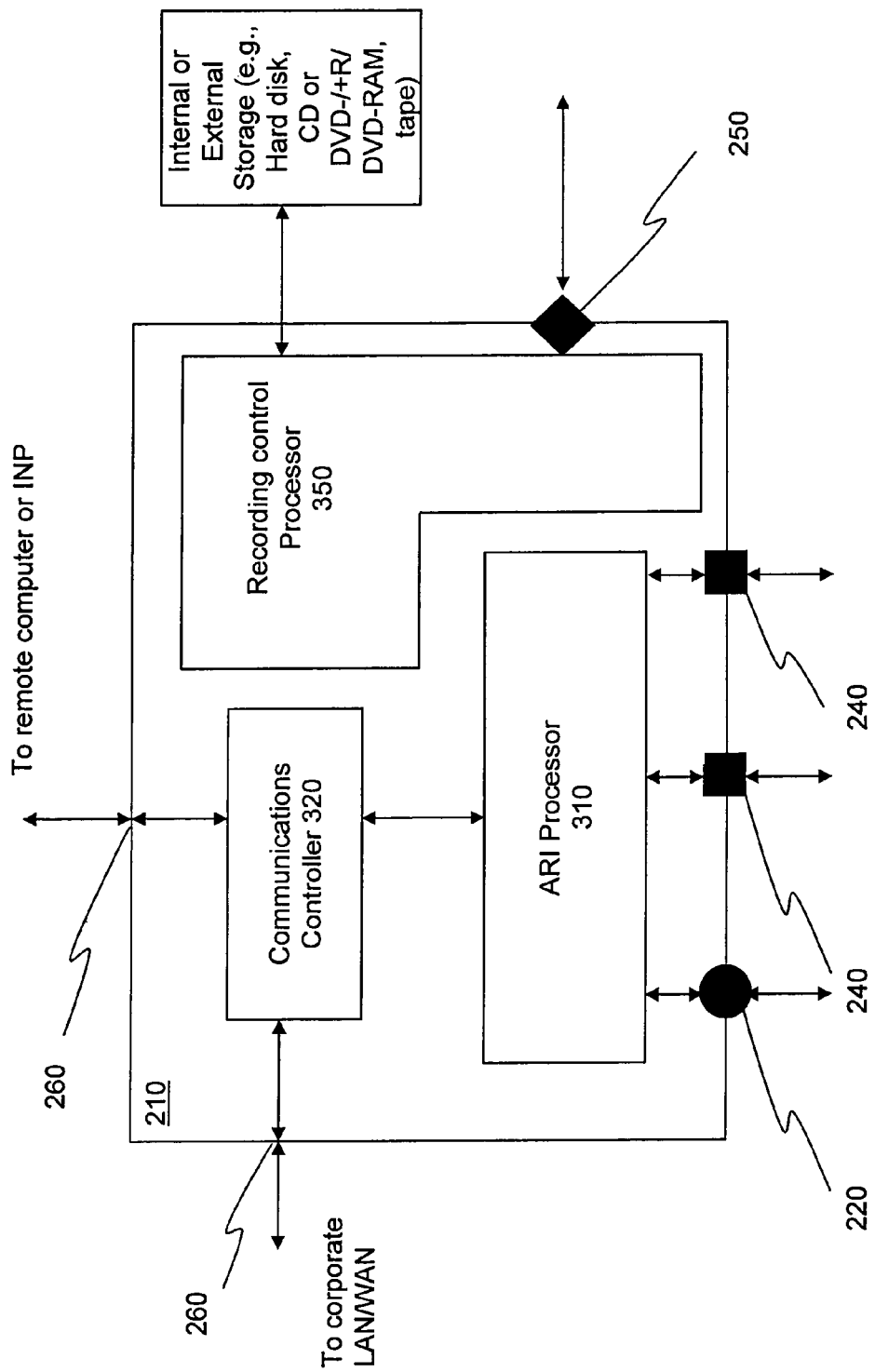
FIG. 3a is a block diagram of an Intelligent Network Peripheral according to a first exemplary embodiment of the present invention.

As shown in FIG. 3a, an Intelligent Network Peripheral (INP) 210 includes a housing having therein plural communications ports 240, such as connectors for receiving Ethernet-style cables, and/or at least one user interface connection 220 for receiving from and sending to a server video or user interface signals, respectively. However, it should be noted that the ports of the INP 210 need not all be the same, and the signals transferred across the communications ports 240 need not all be the same either. For example, some communications ports 240 may be for transmitting digital signals including digitized video and other communications ports 240 may be for transmitting analog signals.

Figure 3B:
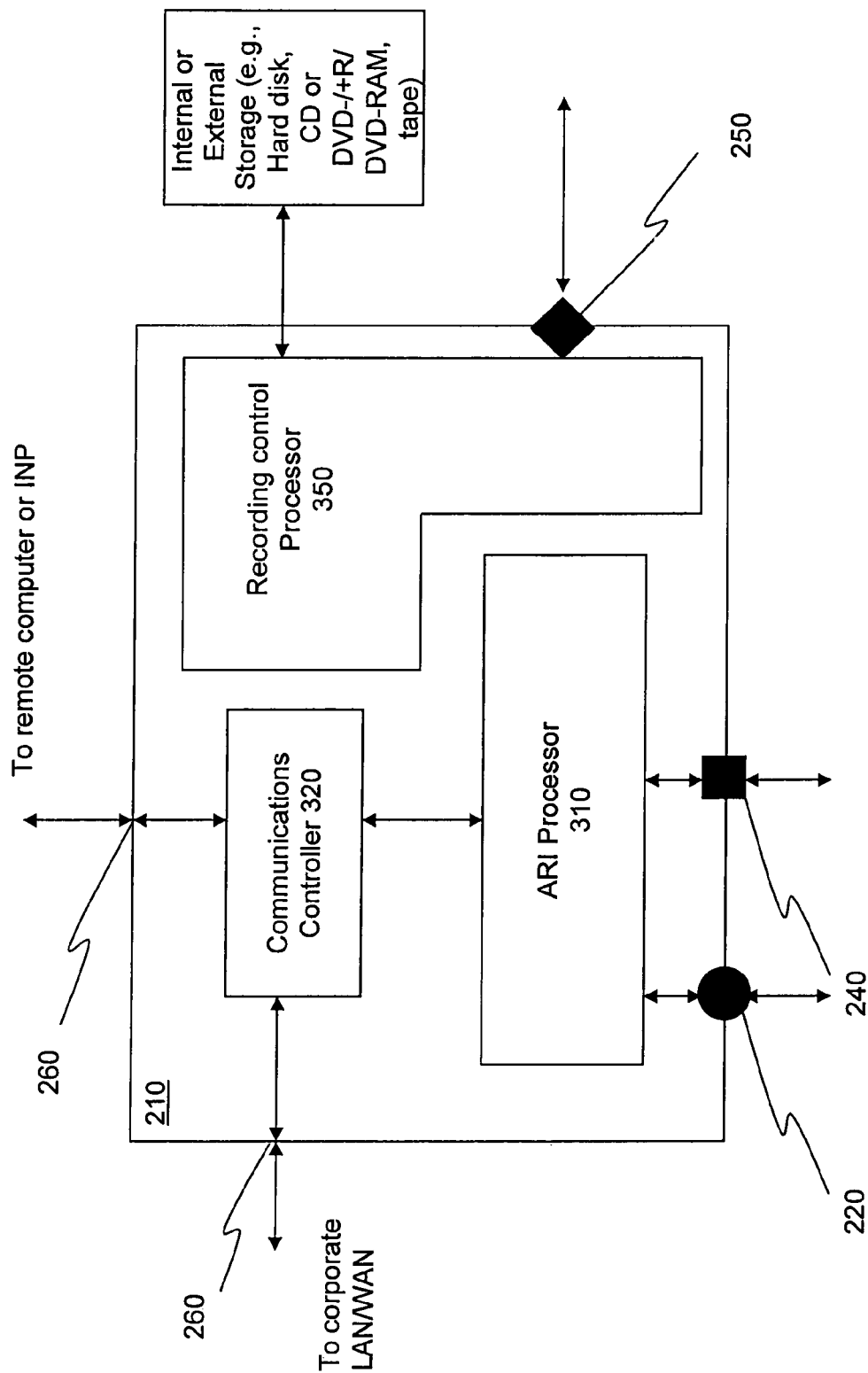
FIG. 3b is a block diagram of an Intelligent Network Peripheral according to a second exemplary embodiment of the present invention.

Alternatively, as shown in FIG. 3b, instead of using plural communications ports 240, an INP 210 may instead include a housing with a single communications port 240, such as a connector for receiving an Ethernet-style cable, that is connected to a switch or router, such as router 290 shown in FIG. 2b. Over at least one communications port 240 multiplexed signals are received at the INP 210 from at least one RIP 100. The multiplexed signals can include user interface signals, video signals and any other signals that are to be transmitted between the RIP 100 and the INP 210.

In a configuration (such as in FIGS. 2a and 2b) where a remote computer 190 is monitoring the activities of at least one of the servers 120, at least a portion of the signals received by the INP 210 are forwarded on to the remote computer 190 via a communications controller 320 (e.g., an Ethernet controller) connected to a remote computer connection 260. Alternatively, in a configuration (such as in FIGS. 2a and 2b) where a local computer interface (e.g., a computer monitor and at least one peripheral device such as a keyboard or mouse) is monitoring the activities of at least one of the servers 120, at least a portion of the signals received by the INP 210 are forwarded on to the local computer interface, e.g., for display on a computer monitor, via a KVM interface connector 250.

In addition to acting as a conduit through which signals can be transmitted between RIPs 100 or server 120 and a user, the INP 210 can also act as a switch. For example, in the case of a user using the local KVM interface connector 250, signals may be sent from a peripheral device (e.g., a keyboard or mouse) across the KVM interface connector 250 to the INP 210 to indicate which one of the servers 120 is to have its video transmitted to the user over the KVM interface connector 250. Thus, the ARI processor 310 is designed to receive switching commands for controlling which server 120 is considered the "active" server with respect to the KVM interface connector 250. In at least one embodiment, the ARI processor 310 is also capable of selecting which server 120 is considered the "active" server with respect to the remote computer 190. In one embodiment of the present invention, a selection of the "active" server via the KVM interface connector 250 or from the remote computer 190 changes the "active" server for both the KVM interface connector 250 and the remote computer 190. In this way the images seen by two geographically separated users stay synchronized. In an alternate embodiment, a selection of the "active" server via the KVM interface connector 250 or from the remote computer 190 does not change the "active" server for the other interface.

While known KVM switches have enabled a user to see the status of a remote computer or server 120, a system administrator or other user using the KVM switch has not been able to see what has happened when a server is not the active server and has not been able to record what happened while interacting with a server for reference or playback later. Accordingly, as shown in FIGS. 3a and 3b, the INP 210 is further equipped with a recording control processor 350 that is connected to at least one internal or external recording device (e.g., hard drive, disk array, CD-recorder, DVD recorder, and/or tape device). The recording control processor 350 can connect to such a recording device using a peripheral interface (e.g., USB, FireWire, SCSI or SATA), or the recording control processor 350 can connect to such a recording device using a network connection (e.g., Wi-Fi or Ethernet) to reach network-based storage (e.g., a LINKSTATION, a TERAS-TATION or other Network Attached Storage (NAS) or Storage Area Network (SAN) devices). In the case of connections using a peripheral interface, in one embodiment at least one peripheral interface supporting hot-swappable devices is used to enable one recording device (e.g., a full device) to be removed while another recording device continues recording. A new recording device can then be re-connected in place of the removed (e.g., full) device.

Figure 4A:
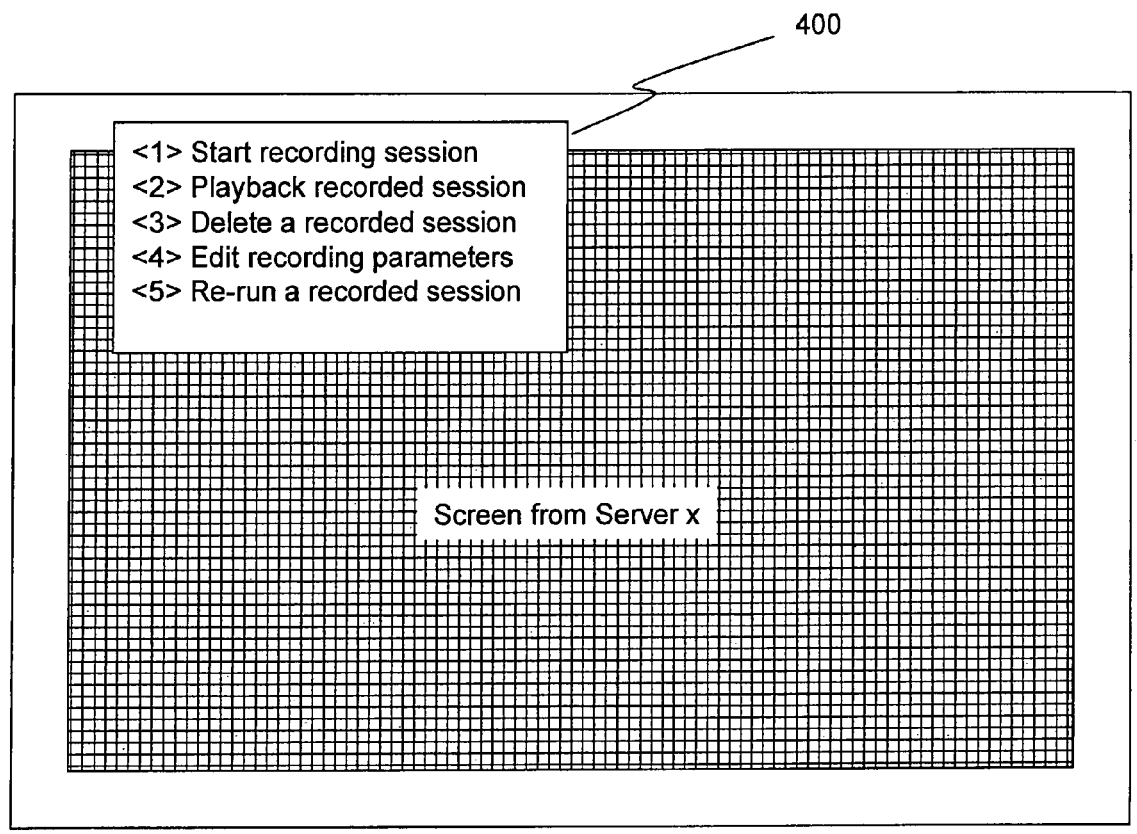
FIG. 4a is an illustrative representation of a screen showing menuing information for controlling recording and/or playback using a menu that overlays a portion of a screen of a server.
Figure 4B:
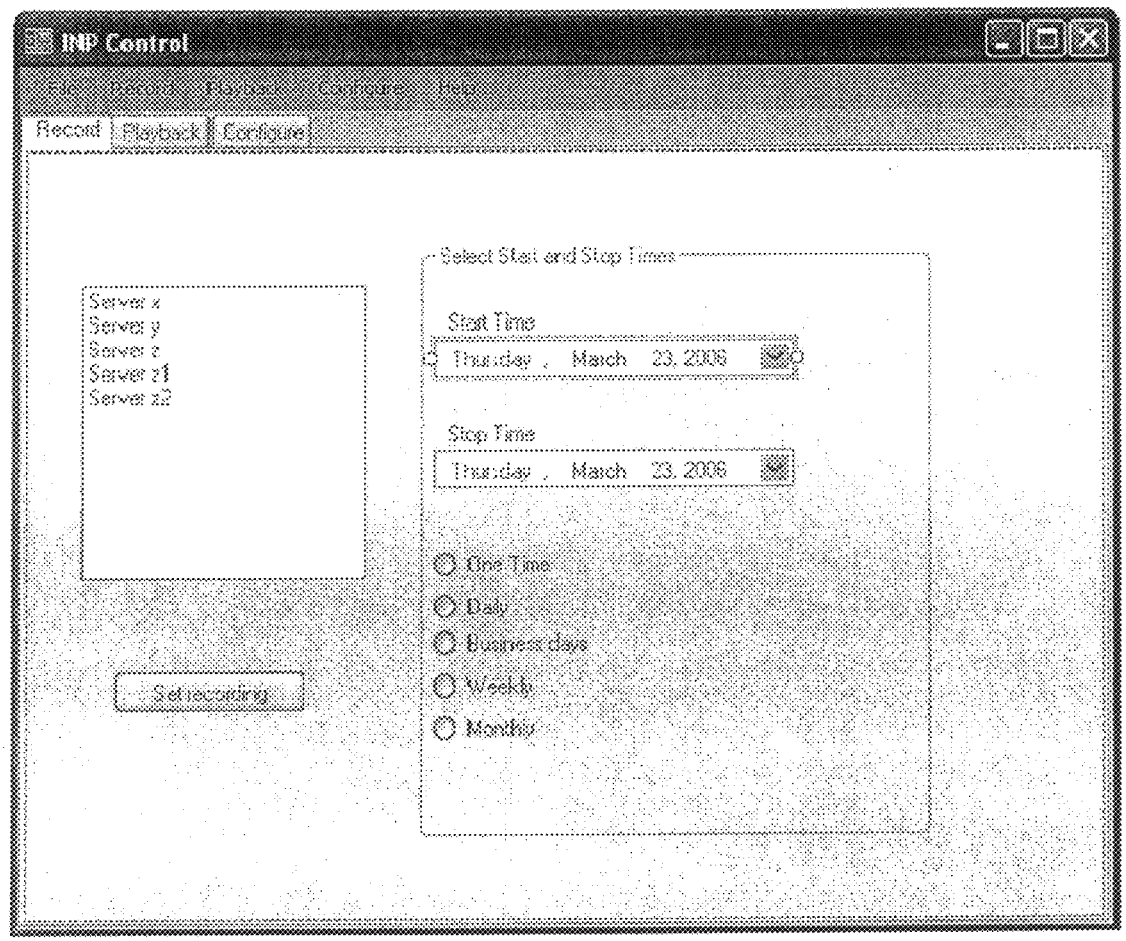
FIG. 4b is an illustrative representation of a screen showing menuing information for controlling recording, playback and/or configuration.

As shown in FIG. 4a, using an INP 210, a user may request that an interface 400 prompt the user to perform an activity, such as (1) start a new recording session, (2) playback a recorded session, (3) delete a recorded session, (4) edit recording parameters (e.g., the number of stored frames, the length of a session to record, the resolution of the image to record), and (5) re-run a recorded session. Such an interface can be created by a recording control processor 350, as shown in FIGS. 3a and 3b, for example by using on-screen display circuitry connected to KVM interface connector 250 or by sending at least one message to an application running on a remote computer 190. As shown in FIG. 4b, the at least one message received on a remote computer 190 may be interpreted by a specialized application (e.g., DSView) or may be interpreted by a standard application (e.g., a web browser). The interface may give information such as a list of servers, start times and recording parameters (e.g., recording time and quality, events to log, and how and where to store the recording).

Figure 5:
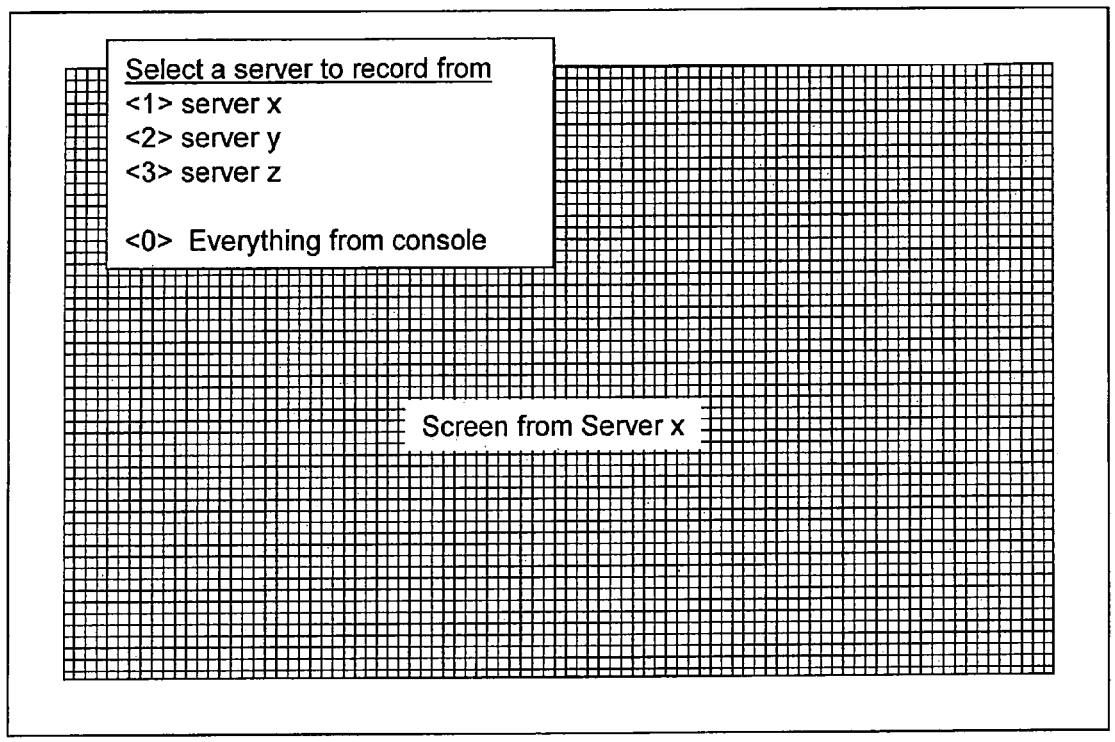
FIG. 5 is an illustrative representation of a screen showing menuing information for controlling recording.

Assuming that a user selected to start recording a session, a further interface, such as that shown in FIG. 5, may be presented to the user to determine what to record if the initial interface did not provide that choice. For example, the user may select a server to be recorded or a user may select that everything happening at a console be recorded. In the former case, a user may go back and determine what a user did at a particular server, but the user would not be able to determine how it got to that server. In the latter case, the user would be able to track each action including which server was chosen and when in relation to when other servers were chosen. In the latter case, the user would be able to determine what happened at each server during the recorded session as well. This can be beneficial in a case where multiple servers may appear to be the same and a user is trying to determine where a command that was intended to be issued at server x was really issued.

In the case where a user is interacting with a server (e.g., 120a or 120b) that is directly connected to an INP 210 (e.g., 210a), the INP 210a can perform the recording itself. Alternatively, if a user wanted to record the output of a server (e.g., 120c or 120d), then the user would have two options for controlling the recording. The user could request that INP 210a perform the recording or the user could request the INP 210a to control a cascaded INP (e.g., 210b) to control the recording instead. In the latter case, when a user wishes to see the recording later, the user can either playback the recording from INP 210b across a corresponding digital or analog connection between the INPs, or the user could request that the recording be transferred from the INP 210b to the INP 210a before being played. Alternatively, a user connected to yet another INP (not shown) could access the video without having to go through the first INP 210a. The INP preferably stores the recordings and information about them in a fashion that enables the recordings to be requested by alternate interfaces (e.g., a web browser, a media player, a Virtual Network Computing (VNC) client and a Remote Desktop Protocol (RDP) client), preferably after user authentication.

The recordings are preferably stored in encrypted form. The recordings may be transmitted in encrypted form (e.g., by decrypting the recording after authentication and then transmitting the decrypted video using an encrypted socket connection such as SSL or by transmitting the encrypted recording and requiring decryption at the receiver) or in non-encrypted form (e.g., in cases where physical security of the wiring is sufficient).

When recording a session, the INP 210 can record information related to, but not limited to, user interface inputs (e.g., keyboard entries, mouse movements, mouse clicks) that are directed to the monitored server and the received video from the monitored server. However, the INP 210 can also record the user interface inputs that are directed to the INP 210, such as menu selections, hotkeys, and short-cut keys. The recording further can include captured images of the user interface selections of the INP as they are selected, or sufficient information about the selections so as to enable the INP 210 to replay the selection. The INP may further record audio if audio is received from a monitored server.

It should be noted that the recording may be of a server that is not the active server, for example, if a system administrator wants to be able to watch what happened on a server that is having problems without requiring that the administrator continuously monitor the server as an "active" server.

Figure 6A:
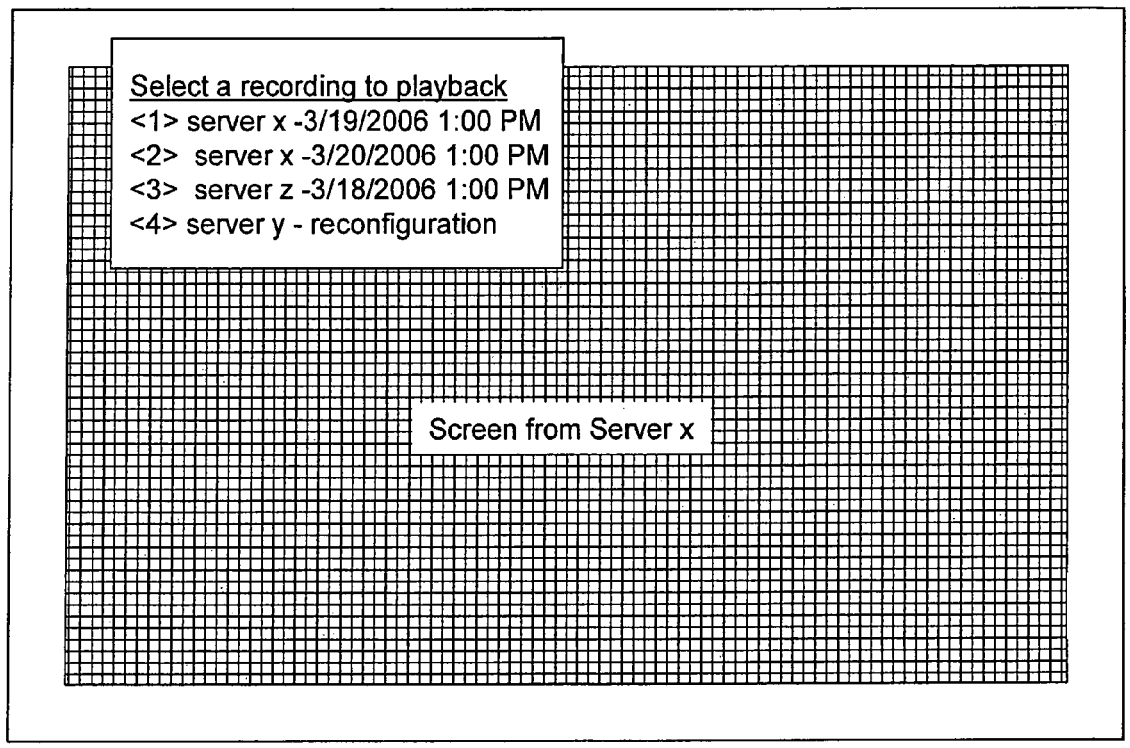
FIG. 6a is an illustrative representation of a screen showing menuing information for controlling playback.
Figure 6B:
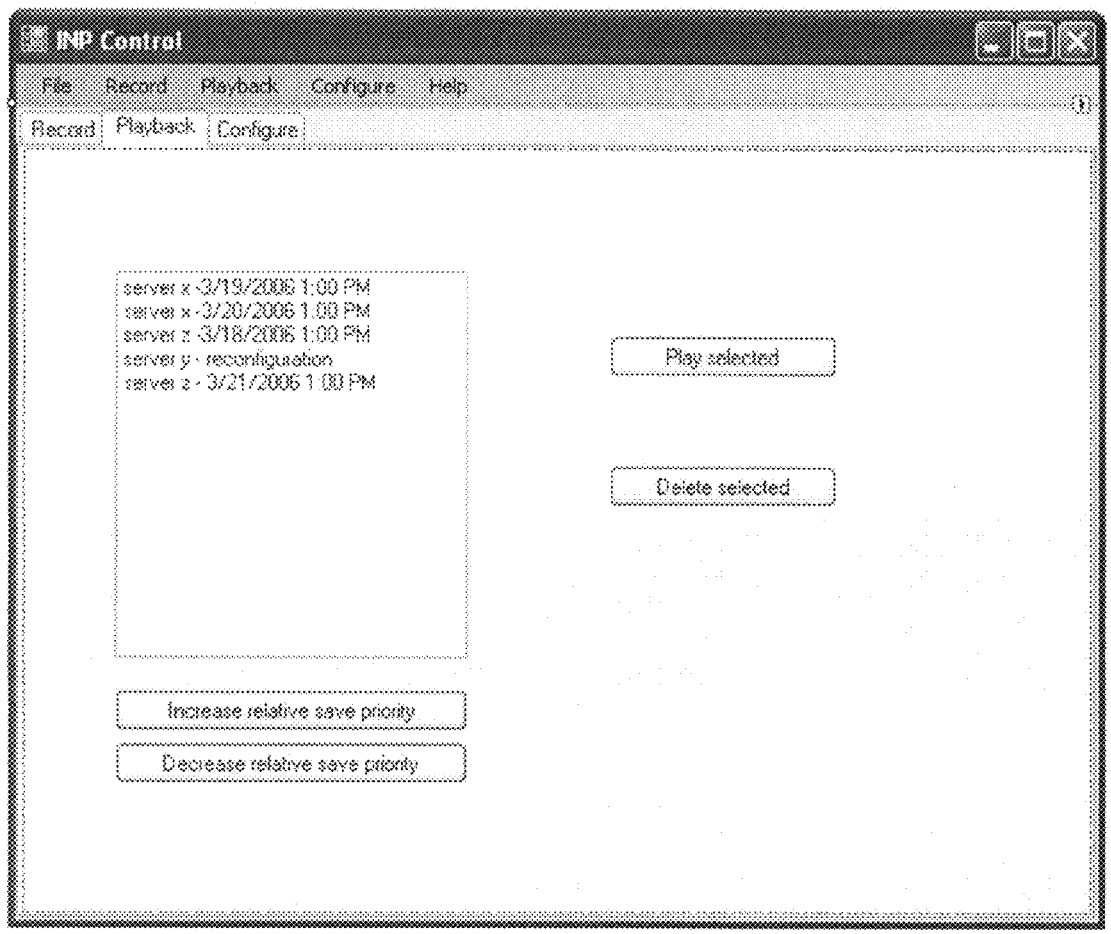
FIG. 6b is an illustrative representation of a screen showing menuing information for controlling playback, deleting and prioritizing of recordings.
Figure 7:
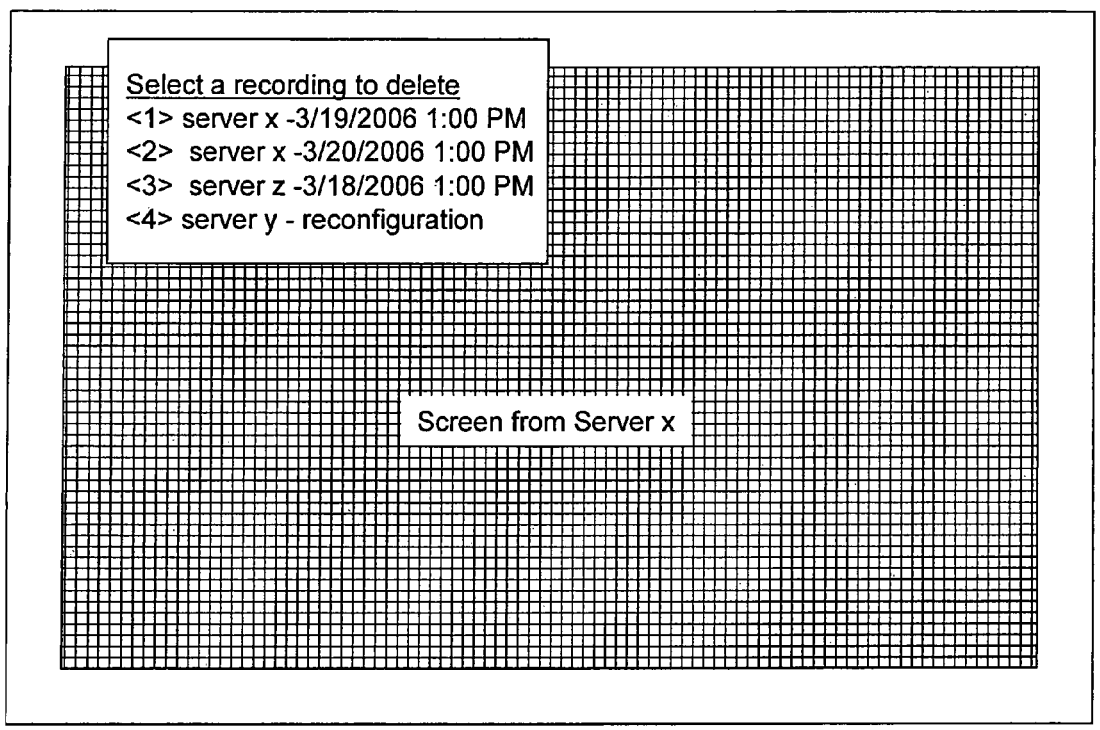
FIG. 7 is an illustrative representation of a screen showing menuing information for controlling deletion of a recorded session.

Having recorded a number of sessions of video, users can later request to view one of the recorded videos using screens such as shown in FIGS. 4a and 6a or FIG. 6b. As shown in FIGS. 6a and 6b, a list of available recordings may be presented to a user, either at a local computer interface (e.g., by using on-screen display circuitry that overwrites part of a remote computer's (or INP-style device's) received video image) or in a window or other interface at a remote computer 190. When the user selects the session to be played back, the recording is read out of the corresponding storage device or devices and displayed to a user. The playback may be at either full-screen or at less than full-screen. For example, in one embodiment a played back image may run next to a live image of the same or a different server. The number of simultaneous recordings and playbacks may be varied and may depend on the amount of hardware support that is available within the INP.

Since not all keyboard interactions necessarily result in an alphanumeric character being displayed on a screen (e.g., in the case of hotkeys and key modifiers such as ctrl, alt or shift), and since not all mouse actions necessarily are evident from the video, the INP preferably produces an overlay or other visual indication of all peripheral device events as they occur in the playback. For example, a small picture may be placed in a configurable location on the screen that shows the status (depressed or not) of each of the keys of a keyboard and each of the buttons of a mouse (including the scroll wheel). As events occur, the picture is updated to reflect changes, such as a left mouse button being clicked while the control button was held down on the keyboard. The display may further include a display of the time that the corresponding part of the session was recorded or a time since the beginning of the recorded session.

The events of a recording may also be "re-run" and directed to the same server or a different server than the server from which a recording was made. The recorded video and the live video of the server being interacted with in real-time may be placed on the same monitor (e.g., in smaller form) or on different monitors. For example, as shown in FIGS. 2a and 2b, a secondary/playback monitor may be coupled to an INP such that the video of live interactions is received over the monitor of the local computer interface and the recorded video is played out to the secondary/playback monitor. This allows both the original and the played back video to be seen at full-screen. In the context of a remote computer 190, the played back video can be received at a different remote computer, or can be displayed on a second monitor of the remote computer (e.g., when the remote computer has a dual video card or dual monitor configuration).

In one possible use of the "re-run" feature, after a set of interactions with a first server has been completed and the correctness of that set of interactions has been verified, then the user may elect to "re-run" those interactions using the same server or a different server, either at a same speed or at a different speed than initially recorded. For example, if a set of commands is issued (and recorded) with respect to server "x" where the commands cause server "x" to be reconfigured (and potentially re-booted), then the user could switch to server "y" and "re-run" those commands to similarly reconfigure (and potentially re-boot) server "y," thereby saving the user the time and effort of repeating the work. During the playback, the user may watch the screen of the recorded video and the screen of the live video to ensure that the interactions are working the same with respect to both servers. If not, the user may elect to cancel the "re-run" in mid-sequence, e.g., using the keyboard or mouse. In an alternate configuration, the user may elect to forgo having to watch the video on the new server while the interaction is being re-run there and may move on to other servers. Such other servers may have the same or other interactions "re-run" simultaneously.

During a "re-run," the video of the server being interacted with may be overlayed or otherwise supplemented with a visual indication (e.g., a graphic or text) that represents the actions that are about to occur but before they occur, in case the user wishes to stop the "re-run" at a known point or because something has changed. For example, if an administrator sees that a "re-running" session is about to issue a reboot command to a server, but there are still users connected to the server (whereas there were not any when the session was initially recorded), the administrator will see a visual indication that the reboot command is to occur prior to its execution such that the administrator can stop it from being executed by stopping or pausing a portion of the "re-run." Such a pausing may also be beneficial in the case of one computer taking longer to complete a particular action than another. For example, re-formatting a 100 Gb drive on one computer typically does not take as long as re-formatting a 300 Gb drive on a similar computer. Thus, the INP, when recording a session, may include the ability to have the user or administrator insert a virtual command into the recording that the INP recognizes during playback. During playback, the INP would then wait for a specified user input before allowing the playback to continue. (The INP could likewise be configured to require user input before each event is re-run, thereby creating a step-by-step mode.) Thus, an INP can record and playback macro-like functions (on one server or even across plural servers) without requiring any specialized software to be loaded onto the servers.

The playback of a recorded session can be controlled much like the video of a DVD player. A user preferably can playback a recording at normal speed (i.e., 1×) or at faster speeds (e.g., 2×, 3×, 4×, 8×) or at slower speeds (e.g., ½×, ¼×) in both the forward and reverse directions. Alternatively, for increased simplicity, one can reverse by a fixed amount (e.g., 1-minute or 5-minute intervals) and then start going forward again to find a desired location. This allows the use of a single-direction differential encoding method that might not otherwise lend itself to reverse playback.

The playback may also be controlled to skip forward or skip back to an event of a particular type or at a particular time. For example, a user may request to skip backward to a last reboot of a server or skip forward to a next switch to another server. Similarly, the user may control the playback to scan for certain events (e.g., switches to a new server or to a particular server) and then to play for a configurable period of time (e.g., 10 seconds) before scanning for the next similar event, much as one might scan various radio stations on a car radio to look for a song that one likes. Having recorded an event in one recording, a user may also be able to request to see the video and events of other recordings from approximately the same time.

The playback of a recorded session may also occur while the recorded session is in progress. For example, if, while watching server "x", a user had to switch to server "y", the user could elect to "pause" a current session for server "x", make the switch to server "y", switch back to server "x" and then unpause the session for server "x". The INP 210 would have continued recording the session for server "x" even while the video output for that session was paused. Alternatively, a user may want to rewind to look at something about a session again. This too can be done while the session continues to be recorded. The user can also elect to "catch back up" to the live portion of a session.

When a user switches to a new session, the INP 210 can be configured to automatically begin recording that new session for a configurable amount of time since a user may wish to capture the state of a session as it existed when the user switched to it (and therefore before the user had the chance to manually select to record). However, the INP may also be configured to throw away parts of automatically recorded sessions if the user does not indicate to keep the session after a configurable period of time. For example, when in automatic recording mode, the INP may save the most recent 10 minutes of a session and begin discarding anything thereafter if a user does not elect to record the current session. When configured to automatically record 10 minutes, the INP acts as a tape loop which writes over minute 1 when it records minute 11.

In addition to automatically beginning recording when a user switches servers, the INP 210 may be configured to automatically begin recording under other circumstances as well. For example, a session may automatically be recorded when a corresponding computer is powered up or down or when a configurable screen condition occurs (e.g., more than 80% of the screen is blue). A session may also be configured to automatically begin at a particular time of day (e.g., every weekday at 8 am). Similarly, sessions may be configured to automatically start under other conditions, e.g., after a configurable amount of inactivity or after the first activity after a configurable amount of inactivity.

The configuration of an INP 210 is preferably through at least one interface of the INP. For example, an INP may be (1) remotely configured via (1a) a remote computer running a custom or specialized application (e.g., DSView), (1b) by a remote computer running a web browser, (1c) by a remote computer sending a digitally signed message or email to the INP or (2) locally configured by a local computer connected to the INP via a serial or parallel communications interface (e.g., USB or RS-232) or (3) directly configured by a local computer interface connected to the INP 210. If one of the configuration mechanisms is currently in use, it is possible that the others can be locked out so as to avoid inadvertently overwriting configuration information. Alternatively, the configuration information can be broken into sections with one or more sections being locked without locking all the sections. In such a case, mutually exclusive characteristics can be updated simultaneously by separate applications.

The configuration may include, but is not limited to, information such as: where recordings are to be stored, what recoding resolution to use, what playback resolution to use, what the configuration (e.g., names, models, etc.) is of computers or INP-style devices that are connected (directly or indirectly) to each INP, what language to use for prompts, what version of firmware to upgrade to, whether/when intrusions have been detected, what files are available to what users, what network settings (e.g., addresses, masks, and gateway(s)) to use, and whether to use DHCP. The configuration information may also provide how certain events or actions (e.g., SNMP traps) are to be handled. For example, SNMP traps may be generated on conditions such as: power up, shutdown, session recording started, session recording ended, session playback started, session playback ended, SNMP trap designated receivers changed, storage space low, recording disallowed (e.g., when out of disk space or when removable media needs to be changed), recording terminated early due to lack of space and recorded session deleted. The receivers for the SNMP traps may likewise be configured, including the number of receivers to use.

The remote configuration may even include: (1) when recordings are to start, (2) recording schedules, (3) schedules to delete old recordings, (4) whether a recording can be deleted and (5) relative priorities for recorded sessions such that recordings may be automatically deleted when recording space become low. In addition to manually being able to set relative priorities (as in FIG. 6b), exemplary relative priorities can be set based on factors including, but not limited to: (1) first-recorded, first deleted, (2) archive by appliance, treat all other recorded sessions as first-recorded, first deleted, (3) archive by user, treat all other recorded sessions as first-recorded, first deleted, and (4) archive by target, treat all other recorded sessions as first-recorded, first deleted.

The configuration information may also include information to control when recorded sessions from one storage medium (e.g., hard disk) are written to another storage medium (e.g., tape, DVD or an alternate INP if there is room), and if such a feature is even enabled.

As described above, recording resolution may be set. Preferably the recording resolution is set such that playback of events is precise (e.g., events are recorded with a 1 ms resolution).

In addition to the video sessions described with reference to FIGS. 2a and 2b, it is further possible for the INP 210 to record RDP and VNC sessions that have been routed through the INP 210.

While the above description has been given in terms of various processors inside the INP 210, it should be understood that the functionality of more than one logical processor can be combined into a single processor. For example, the ARI processor 310 and the communications controller 320 may simply be different programs running on the same physical processor or different routines within the same program. Also, while the above description has been given in terms of circuitry, programming, logic and hardware, it should be understood that the amount of circuitry, programming and logic can be changed, depending on how the devices, such as those described herein, are to be built. For example, more circuitry and less programming can be used as the amount of integration increases in integrated circuit design. Alternatively, a minimum amount of circuitry (e.g., just A/D and D/A converters and communications hardware) can be used along with a greater amount of programming if the internal design of the system (e.g., the types of messages and the protocols for handling them) is expected to change over the lifetime of the device(s). Other exemplary hardware includes a processor running code loaded from a non-volatile (and potentially reprogrammable) memory, a custom ASIC, and a one-time programmable or a reprogrammable logic device, such as a GAL, FPGA or the like.

While the above has described various connectors for use in various devices, it should be understood that embodiments of some such connectors may require additional circuitry to pre-process or post-process the signals received from or sent to the communications media to which they are connected. Such circuitry may include, but is not limited to, drivers, wave shapers, filters, packetizers, de-packetizers and optical converters.

While certain configurations of structures have been illustrated for the purposes of presenting the basic structures of the present invention, one of ordinary skill in the art will appreciate that other variations are possible which would still fall within the scope of the appended claims.

The invention claimed is:

1. A peripheral device enclosed in a housing for intercepting and recording interactions between a user interface device and first and second servers, the peripheral device comprising:
   a first computer-side interface for receiving signals corresponding to computer video signals of the first server and for selectively (1) transmitting signals corresponding to changes in state of the user interface device to the first server when the first server is the active server and (2) not transmitting signals corresponding to changes in the state of the user interface device to the first server when the first server is not the active server;
   a second computer-side interface for receiving signals corresponding to computer video signals of the second server and for selectively (1) transmitting signals corresponding to changes in state of the user interface device to the second server when the second server is the active server and (2) not transmitting signals corresponding to changes in the state of the user interface device to the second server when the second server is not the active server;
   at least one user-side interface for receiving signals corresponding to changes in state of the user interface device and for selectively (1) transmitting signals corresponding to computer video signals of the first server when the first server is the active server and (2) transmitting signals corresponding to computer video signals of the second server when the second server is the active server;
   a controller for receiving a switching command for selecting which of the first and second servers is the active server; and
   a recording control processor for recording (1) signals corresponding to computer video signals of the first server when the first server is the active server, (2) signals corresponding to changes in state of the user interface device, (3) a timing correlation between the signals corresponding to computer video signals of the first server and the signals corresponding to changes in state of the user interface device when the first server is the active server, and (4) a timing correlation between the signals corresponding to computer video signals of the second server and the signals corresponding to changes in state of the user interface device sent to the second server when the second server is the active server, and for beginning recording signals corresponding to computer video signals of the second server when the second server is not the active server but a configurable condition occurs on the second server.

2. The peripheral device as claimed in claim 1, wherein the at least one computer-side interface comprises a user interface connector.

3. The peripheral device as claimed in claim 1, wherein the at least one computer-side interface comprises a communications port.

4. The peripheral device as claimed in claim 1, wherein the at least one user-side interface comprises a KVM interface connector.

5. The peripheral device as claimed in claim 1, wherein the at least one user-side interface comprises a remote computer connection.

6. The peripheral device as claimed in claim 1, further comprising a peripheral interface, wherein the recording control processor records, to a recording device connected to the peripheral device across the peripheral interface, the signals recorded by the recording control processor.

7. The peripheral device as claimed in claim 1, further comprising a non-volatile, rewriteable storage device internal to the peripheral device for storing the signals recorded by the recording control processor.

8. The peripheral device as claimed in claim 1, further comprising means for providing a user interface to the user for controlling recording by the recording control processor.

9. The peripheral device as claimed in claim 1, wherein the recording control processor records switches between the first and second servers connected to the peripheral device.

10. The peripheral device as claimed in claim 1, wherein the configurable condition comprises that the signals corresponding to computer video signals of the second server represent a predetermined image.

11. The peripheral device as claimed in claim 10, wherein the predetermined image is an image having greater than a predetermined percentage of a single color.

12. A peripheral device enclosed in a housing for playing back recorded interactions between a user interface device and a computer monitor of a user and a first server, the peripheral device comprising:
- a first computer-side interface for receiving first signals corresponding to computer video signals of the first server and for selectively (1) transmitting signals corresponding to changes in state of the user interface device to the first server when the first server is the active server and (2) not transmitting signals corresponding to changes in the state of the user interface device to the first server when the first server is not the active server;
- a second computer-side interface for receiving signals corresponding to computer video signals of a second server and for selectively (1) transmitting signals corresponding to changes in state of the user interface device to the second server when the second server is the active server and (2) not transmitting signals corresponding to changes in the state of the user interface device to the second server when the second server is not the active server;
- at least one user-side interface for receiving second signals corresponding to changes in state of the user interface device and for transmitting signals corresponding to computer video signals of the first server when the first server is the active server and (2) transmitting signals corresponding to computer video signals of the second server when the second server is the active server;
- a controller for receiving a switching command for selecting which of the first and second servers is the active server; and
- a recording control processor for playing back third recorded signals corresponding to computer video signals of the second server that was not the active server when the third recorded signals were recorded, wherein at least a portion of the first and third signals are played back for display at the same time.

13. The peripheral device as claimed in claim 12, wherein the at least one computer-side interface comprises a user interface connector.

14. The peripheral device as claimed in claim 12, wherein the at least one computer-side connector interface comprises a communications port.

15. The peripheral device as claimed in claim 12, wherein the at least one user-side interface comprises a KVM interface connector.

16. The peripheral device as claimed in claim 12, wherein the at least one user-side interface comprises a remote computer connection.

17. The peripheral device as claimed in claim 12, further comprising a peripheral interface, wherein the recording control processor plays back, from a recording device connected to the peripheral device across the peripheral interface, the third recorded signals.

18. The peripheral device as claimed in claim 12, further comprising a non-volatile, rewriteable storage device internal to the peripheral device for playing back the third recorded signals.

19. The peripheral device as claimed in claim 12, further comprising means for providing a user interface to the user for controlling playback by the recording control processor.

20. The peripheral device as claimed in claim 12, wherein the at least a portion of the first and third signals played back for display at the same time are displayed on the computer monitor.

21. The peripheral device as claimed in claim 12, wherein the at least a portion of the first and third signals played back for display at the same time are displayed on the computer monitor and a second monitor of the user.

* * * * *